(12) United States Patent
Snyder

(10) Patent No.: US 8,899,144 B2
(45) Date of Patent: Dec. 2, 2014

(54) POPCORN POPPING MACHINE WITH OVERHEAD OIL PUMP

(75) Inventor: Steven A. Snyder, Loveland, OH (US)

(73) Assignee: Gold Medal Products Company, Cincinnati, OH (US)

( * ) Notice: Subject to any disclaimer, the term of this patent is extended or adjusted under 35 U.S.C. 154(b) by 829 days.

(21) Appl. No.: 12/697,366

(22) Filed: Feb. 1, 2010

(65) Prior Publication Data

US 2011/0185914 A1 Aug. 4, 2011

(51) Int. Cl.
A23L 1/18 (2006.01)

(52) U.S. Cl.
CPC ............................... *A23L 1/18* (2013.01)
USPC ................... 99/323.8; 99/323.9; 99/323.5

(58) Field of Classification Search
USPC ............ 99/323.8, 323.5, 323.6, 323.7, 323.9, 99/323.11
See application file for complete search history.

(56) References Cited

U.S. PATENT DOCUMENTS

| 1,976,142 | A | * | 10/1934 | Roach | 99/323.8 |
| 2,907,264 | A | * | 10/1959 | Bushway | 99/323.7 |
| 3,254,800 | A | * | 6/1966 | Baunach | 222/132 |
| 3,294,546 | A | * | 12/1966 | Fingerhut | 426/233 |
| 3,641,916 | A | * | 2/1972 | McDevitt et al. | 99/323.7 |
| 3,739,953 | A | * | 6/1973 | Cretors | 222/318 |
| 5,694,830 | A | | 12/1997 | Hodgson et al. | |
| 5,743,172 | A | | 4/1998 | Weiss et al. | |
| 5,771,779 | A | | 6/1998 | Stein et al. | |
| 5,925,393 | A | | 7/1999 | Stein et al. | |
| 6,092,458 | A | | 7/2000 | Weiss et al. | |
| 6,098,526 | A | | 8/2000 | Stein et al. | |
| 6,352,731 | B1 | | 3/2002 | Weiss | |
| 2006/0086257 | A1 | | 4/2006 | Rhome | |
| 2009/0056558 | A1 | * | 3/2009 | Cretors et al. | 99/323.8 |
| 2009/0133585 | A1 | | 5/2009 | Rhome et al. | |
| 2011/0033588 | A1 | * | 2/2011 | Brush | 426/233 |

* cited by examiner

*Primary Examiner* — Reginald L Alexander
(74) *Attorney, Agent, or Firm* — Wood, Herron & Evans, LLP

(57) ABSTRACT

A popcorn popping machine is provided including a cabinet, a popcorn popping kettle mounted within the cabinet, and a pump mounted at a height above a height of the kettle that is configured to pump oil from a container of oil and deliver the oil to the kettle. Control circuitry is provided for operating the pump to deliver oil to the kettle.

10 Claims, 1 Drawing Sheet

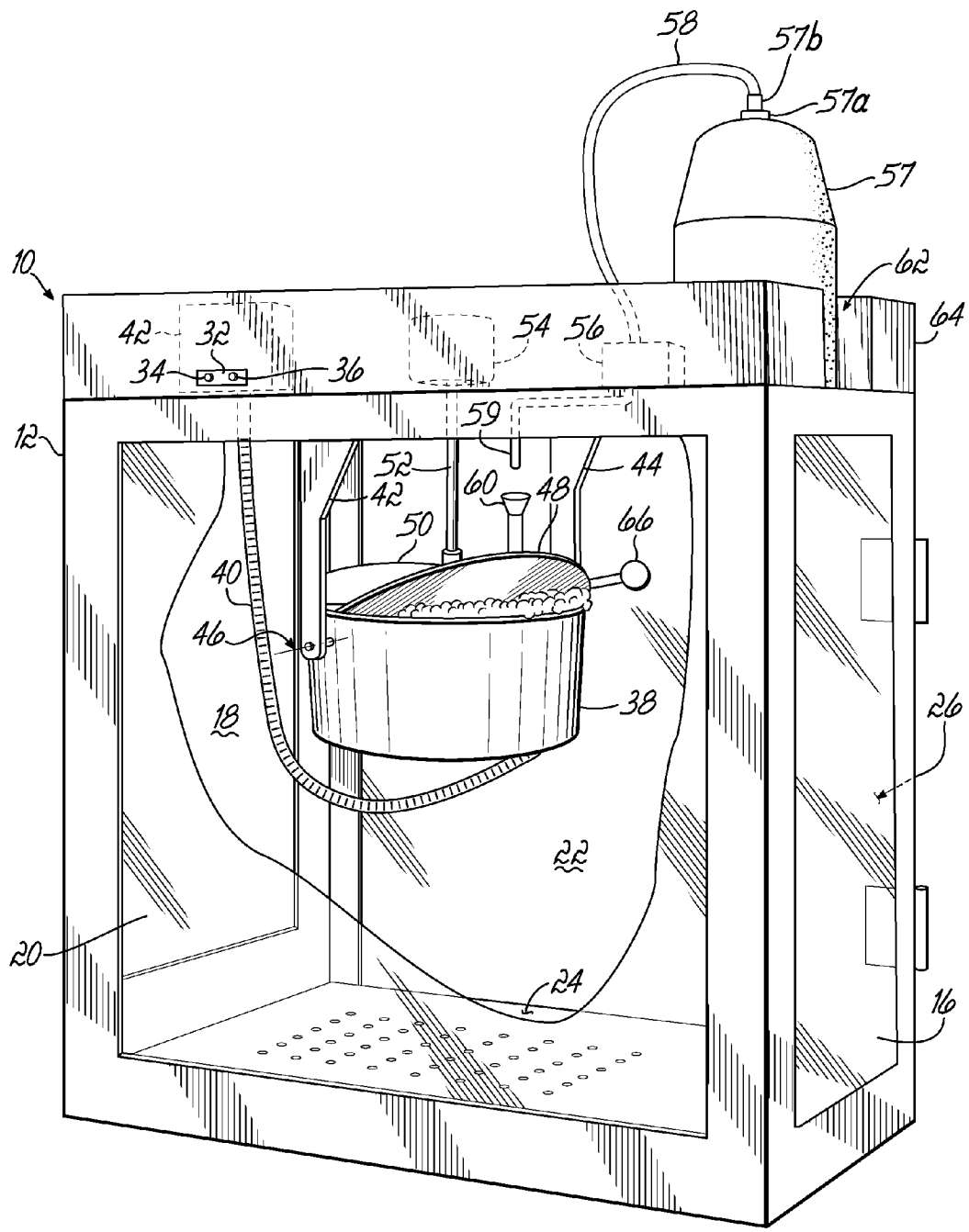

POPCORN POPPING MACHINE WITH OVERHEAD OIL PUMP

FIELD OF THE INVENTION

The present invention relates generally to popcorn popping machines and, more particularly, to an oil delivery system for use in such machines.

BACKGROUND OF THE INVENTION

Popcorn is often mass-produced for sale at movies and other events in commercial popcorn poppers which generally include an enclosed, transparent cabinet containing a tiltable kettle suspended above a catch area or platform. The kettle is heated and uncooked popcorn kernels are placed therein to be cooked and popped. Oil, salt and other flavorings might also be added to the kettle for flavoring the popcorn in the popping process. Once the kernels are popped, the kettle is tilted, either manually or automatically, and the popcorn spills onto the platform to be scooped up, packaged and sold to customers.

In these types of large commercial popcorn poppers, the oil is typically contained in a large pail or in a bag that is contained in a cardboard box ("bag-in-a-box"). A pump is connected to the oil container through suitable tubing so that the oil is delivered from the container, through the pump, and to the kettle mounted within the popcorn popper cabinet. When coconut oil is used, the oil within the container and the oil delivery tubing must be heated so that the oil is liquefied throughout the entire oil flow path from the container to the kettle. The pump is typically located in a lower portion of the popcorn popper, such as in a lower cabinet located beneath the upper popcorn popper cabinet, so that the oil delivery tubing must be routed through the lower and upper cabinets to an oil delivery outlet of the tubing located above the kettle. The delivery of oil may be controlled or automated through the use of a controller incorporated into the popcorn popper so that a controlled amount of oil is delivered to the kettle at the proper time prior to a cooking cycle.

In smaller commercial popcorn popping environments where high popcorn popping capacity is not required, and more recently as home movie theaters have gained in popularity, popcorn poppers have been developed that have smaller kettles, such as 4 oz., 8 oz., 12 oz., 14 oz. and 16 oz. sizes. Typically, with these smaller popcorn poppers, oil is provided in a pouch that is opened for pouring the oil into the kettle before the corn and flavorings or seasonings, such as salt, are introduced. These pouches are typically sized so as to be dedicated to a single batch of corn for use in a popping cycle so many pouches may need to be purchased, i.e., in a case, and properly stored. Alternatively, the oil may be provided in a bar form, similar to bars of butter, that may be split, depending on the kettle size, and introduced into the kettle.

Whether pouches or bars of oil are used, there is always a need for an operator to be cautious when adding oil to a preheated kettle. Moreover, the operator must be certain to add the proper amount of oil to the kettle before the corn and seasonings are introduced. Otherwise, the corn will burn and the batch of unpopped corn must be discarded as waste. If the oil is added to the kettle before the corn and seasonings are introduced, but either too little or too much oil is added, the corn may pop but the resulting batch of popped popcorn may not have an appealing taste and may also need to be discarded.

Therefore, there is a need for a smaller sized popcorn popping machine that simplifies the task of adding oil to a preheated kettle. There is also a need for a smaller sized popcorn popping machine that minimizes the risk of either adding oil to the kettle at the wrong time in the cooking cycle or adding the wrong amount of oil for the corn batch size to be cooked.

SUMMARY OF THE INVENTION

The present invention overcomes the foregoing and other shortcomings and drawbacks of smaller sized popcorn popping machines that require oil to be introduced into the kettle at the beginning of a cooking cycle. While the invention will be described in connection with certain embodiments, it will be understood that the invention is not limited to these embodiments. On the contrary, the invention includes all alternatives, modifications and equivalents as may be included within the spirit and scope of the present invention.

According to one embodiment of the present invention, a popcorn popping machine is provided including a cabinet, a popcorn popping kettle mounted within the cabinet, and a pump mounted at a height above a height of the kettle that is configured to pump oil from a container of oil and deliver the oil to the kettle.

A first oil delivery conduit is configured to establish fluid communication between the container of oil and an inlet of the pump. A second oil delivery conduit is configured to establish fluid communication between the outlet of the pump and the kettle.

According to one aspect of the present invention, the pump is mounted in an upper portion of the cabinet. In other embodiments, the container of oil is also supported at a height above the height of the kettle, and may also be supported in an upper portion of the cabinet.

The popcorn popping machine may be provided with control circuitry, such as a controller, for operating the pump. In this way, the pump is operated to deliver oil from the container of oil to the kettle at the beginning of the cooking cycle. The operator may engage an oil pump switch to deliver a premeasured amount of oil from the container of oil to the kettle. The oil pump switch may be effectively disabled until all conditions are proper for a cooking cycle, such as when the kettle is in an upright position and properly preheated.

The above and other objects and advantages of the present invention shall be made apparent from the accompanying drawings and the description thereof.

BRIEF DESCRIPTION OF THE DRAWING

The accompanying drawing, which is incorporated in and constitutes a part of this specification, illustrates an embodiment of the invention and, together with a general description of the invention given above, and the detailed description of the embodiments given below, serves to explain the principles of the invention.

The FIGURE is a diagrammatic illustration of a back view of a popcorn popping machine according to one embodiment of the present invention.

It should be understood that the appended drawing is not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION OF THE INVENTION

Turning to the FIGURE, a popcorn popping machine 10 is shown according to one embodiment of the present invention. Machine 10 includes a cabinet 12 having transparent walls including two sidewalls 16, 18, a rear wall 20, a front wall 22, and a service platform 24 for catching popcorn. Front wall 22 may include at least one door 26 that is hinged to the cabinet 12 and can be opened to gain access to the popped corn and/or platform 24 of the cabinet 12. The platform 24 may include a plurality of holes to allow the passage of crumbs and/or un-popped popcorn kernels, which may in turn be removed by removing and cleaning a crumb tray (not shown) mounted beneath the platform 24. Sidewalls 16, 18 and rear wall 20, as well as the front wall 22 and/or door 26, may be at least partially constructed of a transparent glass or plastic material such that the interior of the cabinet 12 can be viewed from the exterior.

In one embodiment, the popcorn popping machine 10 includes a control or operator panel 32 mounted on the cabinet 12 that includes at least one operating control 34 (e.g., a switch, a button and/or any other suitable device) for activating a function of the machine 10 and/or at least one indicator 36 (e.g., a light, an LED, a buzzer and/or other suitable device) for alerting a user and/or indicating a problem or other operating condition of the machine 10. Additionally, the machine 10 may further include at least one heating element (not shown) mounted to the bottom of a kettle 38 supported within the cabinet 12 for heating the kettle and the contents therein during a cooking cycle as is known in the art.

The kettle heating element (not shown) may receive power through a control line 40 that is connected to a source of power (not shown). Control circuitry 42, such as a controller and one or more relays (not shown), may be mounted in the top of the cabinet 12 to control the power supplied to the kettle heating element. The controller 42 may also be coupled to the operating controls 34 and/or indicators 36 of the control panel 32 to receive signals therefrom and/or provide signals thereto during operation of the popcorn popping machine 10.

The kettle 38 may be supported by at least one support arm (as illustrated in FIG. 1, the kettle 38 is supported by a pair of support arms 42 and 44) and is tiltable about a tilt axis 46. Additionally, the kettle 38 may be provided with at least one cover (as illustrated in FIG. 1, the kettle 38 includes two covers 48 and 50), which may be configured to be pivotable on the kettle 38. When corn is popped, it pushes at least one of the covers 48, 50 open and falls onto platform 24. Moreover, it will be appreciated that cover 48 is located over a so-called "dump section" or side of the kettle 38. When the kettle 38 is tilted, cover 48 pivots open to facilitate dumping of popcorn onto platform 24.

The kettle 26 may include an internal agitator, stir blade or rotor (not shown) that is driven by a rotor drive shaft 52 and rotated by a stir motor 54. The rotor drive shaft 52 may have an upper end that includes a gear (not shown) configured to intermesh with a drive gear (not shown) rotated by the stir motor 54. The stir motor 54 may be activated by an appropriate switch on the control panel 32, controlled by the controller 42 and/or automatically activated in response to power being supplied to the machine 10, the kettle heating element and/or oil being added to the kettle 38.

According to one aspect of the present invention, the popcorn popping machine 10 includes an oil pump 56 that is configured to receive oil from a container of oil 57 located in close proximity to the machine 10. The oil may be a blended or other suitable oil, such as corn or sunflower oil, that is liquefied at room temperature so that heating of the container 57 is not required. The container 57 may be a plastic bottle or jug, containing liquid oil, a bag of oil in a box, or any other suitable type of oil container.

In one embodiment, a first oil delivery conduit 58 extends between the container 57 and in inlet of the pump 56 so that oil is conveyed from the container 57 to the pump 56. The container 57 may be provided with a cap 57a having a fitting 57b that is connected to one end of the oil delivery conduit 58. A second oil delivery conduit 59 extends from an outlet of the pump 56 to a location fixed above a funnel 60 that is mounted to the kettle 38 between covers 48 and 50. The pump 56 may be activated by an appropriate switch on the control panel 32, controlled by the controller 42 and/or automatically activated in response to power being supplied to the apparatus 10, the kettle heating element and/or oil being added to the kettle 38. One suitable pump for use in the present invention is the Model ETS17 oil pump commercially available from Gotec SA located in Sion, Switzerland.

In one embodiment, the pump 56 is mounted integrally with the cabinet 12 and is located in an upper portion of the cabinet 12 as shown in the FIGURE. At this location, the pump 56 is located at a height above the height of kettle 38. The container of oil 57 may also be located at a height above the height of the kettle 38, such as supported in an upper portion of the cabinet 12 as shown in the FIGURE, so that the entire oil delivery fluid path established between the container of oil 57 and the kettle 38 through oil delivery conduits 57 and 59 is located at a height above the height of the kettle 38. Alternatively, the container of oil 57 may be located at the same height as the height of the kettle 38 or, in another embodiment, located at a height below the height of the kettle 38, such as resting on a countertop or a floor near the machine 10.

In one embodiment, the upper portion of the cabinet 12 is provided with a recess 62 that is sized and configured to receive the container 57 of oil therein. In this way, the container 57 is easily mountable onto and removable from the recess 62.

Operation and control of the pump 56 and the at least one kettle heating element (not shown) may be in accordance with the pump and/or kettle heater operation and control fully described in one or more of U.S. Pat. Nos. 5,694,830, 5,743, 172 and 6,352,731, each assigned to the common assignee and each disclosure of which is hereby incorporated herein by reference in its entirety to which the reader is referred.

For example, the oil pump 56 may be operably coupled to an oil pump switch (not shown) that is located at the control or operator panel 32. The operator may engage the oil pump switch to deliver a premeasured amount of oil from the container 57 to the kettle 38. The pump 56 will pump oil to the kettle 26 for a predetermined amount of time to deliver the proper premeasured amount of oil. Upon delivery of the oil, the oil pump switch may be disabled so that no more oil may be added until the next cooking cycle. The oil pump switch may be effectively disabled until all conditions are proper for a cooking cycle, such as when the kettle is in an upright position and properly preheated. This prevents oil from being pumped to the funnel 60 from the container 57 until the kettle is hot and in proper position.

In some embodiments, the controller 42 may be configured to monitor the operation of the popcorn popping machine 10 and control power to the heating element of the kettle 38, control the operation of the stir motor 54 and/or control the operation of the pump 56. Additionally, the controller 42 may be configured to determine when the machine 10 is idle and selectively interrupt power to a portion thereof. For example, the controller 42 may be configured to be responsive to the machine 10 receiving power and/or signals from the operating controls 34 to operate portions of the machine 10 to pop popcorn (e.g., the controller 42 may be responsive in one or more of the following manners: when the machine 10 is turned on, the controller 42 is configured to provide power to at least a portion of the machine 10; when an operating control 34 indicates that the kettle heater is to be turned on, the controller 42 is configured to selectively provide power to the kettle heater; when the kettle heating element and/or kettle 38 is ready for a load of popcorn, oil, salt and/or flavoring, the controller 42 is configured to indicate as such with the indicator 36; when an operating control 34 indicates that oil is to be added to the kettle 38, the controller 42 is configured to operate the pump 56 to add oil to the kettle 38 and activate the stir motor 54; when the controller 42 detects that a popping cycle has completed, controller 42 is configured to flash and/or activate the indicator 36 and/or selectively deactivate the kettle heating element; as well as additional manners of operation as discussed above and/or combinations thereof). The controller 42 may also be configured to selectively activate indicator 36 in the event of a problem and/or fault. Also, and as illustrated in FIGURE, the controller 42, stir motor 54 and pump 56 may be positioned to be out of sight behind at least one panel 64 located at the upper portion of the machine 10, while the control panel 32 may be mounted thereupon. Additionally, the kettle 38 may include a handle 66 that can be used to tilt the kettle 26 to dump popped popcorn.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicant's invention.

What is claimed is:

1. An apparatus for popping popcorn, comprising:
   a cabinet;
   a popcorn popping kettle mounted within said cabinet; and
   a pump having an inlet and an outlet and being mounted at a height above a height of said kettle;
   a first oil delivery conduit configured to establish fluid communication between a container of oil and said inlet of said pump; and
   a second oil delivery conduit configured to establish fluid communication between said outlet of said pump and said kettle so as to deliver a predetermined amount of oil pumped by said pump from the container of oil directly to said kettle in response to operation of said pump, with said pump being located externally of the container of oil.

2. The apparatus of claim 1, wherein said pump is mounted in an upper portion of said cabinet.

3. The apparatus of claim 1, further comprising control circuitry for operating said pump.

4. An apparatus for popping popcorn, comprising:
   a cabinet;
   a popcorn popping kettle mounted within said cabinet;
   a container of oil;
   a pump having an inlet and an outlet and being mounted at a height above a height of said kettle and externally of said container of oil;
   a first oil delivery conduit fluidly connecting said container of oil and said inlet of said pump; and
   a second oil delivery conduit fluidly connecting said outlet of said pump and said kettle so as to deliver a predetermined amount of oil pumped by said pump from said container of oil directly to said kettle in response to operation of said pump.

5. The apparatus of claim 4, wherein said pump is mounted in an upper portion of said cabinet.

6. The apparatus of claim 4, further comprising control circuitry for operating said pump.

7. The apparatus of claim 4, wherein said container of oil is supported at a height above the height of said kettle.

8. The apparatus of claim 4, wherein said container of oil is supported in an upper portion of said cabinet.

9. The apparatus of claim 4, wherein said pump, said first and second oil delivery conduits and said container of oil are each supported at a height above a height of said kettle.

10. The apparatus of claim 4, wherein said pump, said first and second oil delivery conduits and said container of oil are each supported in an upper section of said cabinet.

* * * * *